US006978901B1

(12) United States Patent
Adler et al.

(10) Patent No.: US 6,978,901 B1
(45) Date of Patent: Dec. 27, 2005

(54) CERAMIC MULTILAYER FILTERS AND METHOD FOR PRODUCING THE SAME

(75) Inventors: Jörg Adler, Meissen (DE); Reinhard Lenk, Grossschönau (DE); Hans-Jürgen Richter, Dresden (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 09/856,495

(22) PCT Filed: Dec. 3, 1999

(86) PCT No.: PCT/EP99/09479

§ 371 (c)(1),
(2), (4) Date: Sep. 24, 2001

(87) PCT Pub. No.: WO00/35558

PCT Pub. Date: Jun. 22, 2000

(30) Foreign Application Priority Data

Dec. 14, 1998 (DE) ............................. 198 57 591

(51) Int. Cl.⁷ ............................................. B01D 39/00
(52) U.S. Cl. .................. 210/506; 210/490; 210/510.1; 210/509; 210/503; 264/629; 264/113; 156/89.11
(58) Field of Search ................................ 210/503, 490, 210/510.1; 264/628, 113; 156/89.11; 423/335, 423/276

(56) References Cited

U.S. PATENT DOCUMENTS

| | | | |
|---|---|---|---|
| 3,785,781 A | | 1/1974 | Hervert et al. |
| 3,978,248 A | | 8/1976 | Usami |
| 4,777,152 A | * | 10/1988 | Tsukada ...................... 501/80 |
| 4,971,696 A | | 11/1990 | Abe et al. |
| 5,322,537 A | * | 6/1994 | Nakamura et al. ............ 55/523 |
| 5,569,455 A | | 10/1996 | Fukui et al. |
| 5,683,528 A | | 11/1997 | Partlow et al. |
| 5,766,290 A | | 6/1998 | Zievers et al. |
| 5,766,299 A | | 6/1998 | Miller |
| 5,780,126 A | | 7/1998 | Smith et al. |
| 6,576,182 B1 | * | 6/2003 | Ravagni et al. ............. 264/628 |

FOREIGN PATENT DOCUMENTS

| | | |
|---|---|---|
| DE | 2208767 | 5/1984 |
| DE | 3612825 | 10/1986 |
| DE | 4329473 | 8/1994 |
| DE | 4335122 | 4/1995 |
| DE | 19624176 | 5/1998 |
| EP | 574012 A2 | 12/1993 |
| EP | 574012 A3 | 12/1993 |
| JP | 58-03006 | 2/1983 |
| WO | 90/15661 | 12/1990 |
| WO | 96/30207 | 10/1996 |
| WO | 19512146 | 10/1996 |
| WO | 98/28060 | 7/1998 |
| WO | 00/35561 | 6/2000 |

OTHER PUBLICATIONS

R.R. Bhave, Characteristics and Application, VanNostrand Reinhold, New York, 1991, pp. 20-21, 24-25, and 30-31.
Arian Numeuer et al., "Centrifugal Casting of Tubular Membrane Supports", The American Ceramic Society Bulletin, 77(4), pp. 95-98 (1998).

* cited by examiner

Primary Examiner—W. L. Walker
Assistant Examiner—K S Menon
(74) Attorney, Agent, or Firm—Greenblum & Bernstein, P.L.C.

(57) ABSTRACT

The invention relates to the area of ceramics and to ceramic multilayer filters, such as used for separating gases. The invention provides ceramic multilayer filters which are more economical to produce. To this end, the inventive ceramic multilayer filters include at least two layers of different particle size, the particle surfaces of all of the ceramic particles being completely or partially perfused with a material and spot and/or surface joints being formed between particles. The invention also provides a method for producing ceramic multilayer filters of this type, according to which slips are produced from at least two ceramic powders of different particle size, the particles of the ceramic powders being perfused with a material or a material in powder form being added to the ceramic slips. One or more layers are formed from the slips and then dried. At least two layers are placed one above the other and/or joined to each other and together are subjected to a temperature increase.

26 Claims, No Drawings

CERAMIC MULTILAYER FILTERS AND METHOD FOR PRODUCING THE SAME

BACKGROUND OF THE INVENTION

1. Field of the Invention

The present invention relates to the area of filter technology and ceramics and concerns ceramic multi-layer filters and a process for their manufacture, like those that can be used, for example, to separate oil-water emulsions in metal cutting fabrication, to clarify beer, to purify gas, to split gas or to separate liquid-solid mixtures.

2. Discussion of Background Information

Despite the commercial successes of ceramic UF/MF membranes in recent years and the continuing growth of demand, a substantial disadvantage remains as compared to the much more prevalent polymer membranes: the relatively high price per filter surface.

Ceramic filter materials are normally built up of sintered-together particles whose interstices form the porosity. Obtaining the highest possible proportion of pore volume and the most uniform and closely distributed pore size distribution possible is required for filtration purposes. As a result, it is preferred for ceramic powder with a closely distributed grain size distribution to be used for manufacturing ceramic filter materials since these offer the best of the above-mentioned properties. Powders with closely distributed grain size distribution are known and standardized from the abrasives industry.

Normally, ceramic membranes are made of a multi-layer system of porous ceramic whose individual layers have different pore widths. The actual filtering layer is the thinnest and most micro-porous of the system. It is situated on a coarsely porous and thicker layer, and this in turn on the next layer, etc. The coarsely porous material forms the support, which simultaneously assumes the mechanic carrier function of the overall system and also frequently forms the filtrate collection structures. The intermediate layers between support and filtering layer serve to reduce the interstices between the coarse particles of the support and the support of the finer particles of the subsequent layer. Depending upon the desired size of separation, at least one layer, but most of the time at least two layers are currently applied on the support for micro-filtration membranes (size of separation 1000 nm to 200 nm), at least two, but for the most part more than three layers are applied on the support for ultra-filtration membranes (size of separation 100 nm to 10 nm) and more than three layers are applied on the support for nano-filtration membranes (size of separation less than 10 nm).

Manufacturing the above-mentioned ceramic membranes takes places by first forming, drying and firing the support, then the first layer is applied, dried and fired, then the next layer is applied, etc. until the layer made of the finest particles is applied, the layer formed is dried and fired. The sintering takes place in accordance with the degree of fineness of the coating with much lower temperatures than with the support.

The majority of the cost in manufacturing arises due to the multiple repetition of the cycle "coating, drying, sintering." The thermal treatment steps within the process chain are already the most expensive as such so that multiple repetition increases this share immensely. In addition, a cost-intensive manual effort arises along with the other steps.

The joint sintering of ceramic layers made of different ceramics has been known as such for a longer period of time from the fabrication of ceramic multi-layer elements for applications in microelectronics. The term LTCC for "low temperature cofiring ceramics" was coined for this.

However, in this case, layers of different ceramics that have different properties (such as insulating and conductive) are sintered with one another with the goal of achieving the highest possible density of the layers (for example, U.S. Pat. Nos. 3,978,248 and 5,683,528).

On the other hand, in the case of ceramic filter elements, the most similar ceramic layers possible, differing from one another only in terms of their pore sizes, are supposed to be sintered jointly. According to the above-mentioned principle of manufacturing porous ceramics, this means that layers of the same ceramic, but with different degrees of grain fineness, must be sintered jointly.

The main problem with cofiring is the different sinter activity of variously fine powders as a result of difference volume/surface relations. As a result, coarse powders require very high temperatures for a stable grain—grain connection, which originates via surface diffusion or via evaporation or condensation mechanisms.

In the case of very fine powders, on the other hand, the sintering activity is so high that, with equally high temperatures as a result of volume diffusion, a strong densification takes place that is accompanied by grain growth. In this connection, the pore volume diminishes and the pore size distribution shifts in the direction of larger pores. This process is associated with a high volume shrinkage, while the grain—grain bond subsides in the case of coarse powders with lower shrinkage.

But even slight differences in the shrinkage of multi-layer elements with simultaneous sintering lead to a distortion of the multi-layer element or to internal strains that reduce the mechanical load-bearing capacity. In addition, the shrinkage itself is undesired since it leads to changes in the dimensions of the ceramic formed pieces that are difficult to reproduce and make expensive refinishing steps necessary in order to be able to comply with narrow dimensional tolerances.

According to WO 96/30207, a process is known in which the shrinkage adaptation of a component of a multi-layer system is achieved by the use of nanoscale powders. In the case of coarsely porous filters, coarse powders are used and the nanoscale powder is added to the mixture to promote its fusion, while, in the case of fine powders, the nanoscale powder itself is used and sintering inhibitors are added in order to prevent fusion that is too strong. Agglomerates of the nanoscale powder are also used as coarse powder.

Disadvantageous in the case of this process, however, is the fact that precisely coordinating the shrinkage of the individual components requires relatively expensive experiments, the processing of nanoscale powders is very expensive (for example in the case of dispersion), and the powders are very expensive. In addition, the mixing of powders with different degrees of fineness causes a reduction in the pore volume, which is undesirable for filter applications.

The variations for multi-layer filters cited in the exemplary embodiments mention shrinkages of 5% for the support and 4% for the layer, which leads to great problems in practical application.

According to WO 90/15661, a simultaneously sintered two-layer filter is known in which the sintering behavior of the support (called "membrane" in this case) is adapted to the sintering behavior of the layer (called "film" in this case) by a fine powder fraction being added to the coarse powder (4 nm up to 10% of the diameter of the coarse particles) and/or a sintering auxiliary agent being used in order to adapt the sintering temperature of the support to that of the layer.

In this connection, the problem also occurs, however, that the pore volume of the support is reduced by adding the fine powder fraction and coordinating the shrinkage of the layer to that of the support requires expensive experimentation. The difficulty of the process becomes clear in that the shrinkage of the film is supposed to be reduced additionally by high solid loading of the powder dispersion, which is particularly difficult to achieve in the case of fine powders. In addition, the sintering is conducted under pressure load in order to prevent distortion. The shrinkages of the overall system cited in the exemplary embodiments lie between 4 and 11%.

As a whole, two principle problems can be recognized that occur in the case of joint sintering of layers of different grain fineness with the same (low or high) temperature:
a) The different bond strengths of the powder particles i.e., in the case of high temperature, good bonding of the support, but strong sintering of the layer; in the case of low temperature, good formation of the layer but poor bonding of the support (as a consequence, for the purpose of avoiding these problems, every layer type is fired at different temperatures, which differ up to 1200 K).
b) The different shrinkage, which leads to crack formation and delaminations in the layer.

Problem b) leads to very special requirements being placed on layer structure in order to avoid cracks and delaminations. Thus, the following is cited in R. R. Bhave, Characteristics and Application, Van Nostrand Reinhold, New York, 1991:

The layers must be very thin (MF membranes between 25 and 50 µm, UF under 10, to some extent under 5 µm).
The roughness of the support should be low.
Significance is attached to the grain shape of the coating powder.

SUMMARY OF THE INVENTION

The invention is based upon the objective of disclosing ceramic multi-layer filters, which can be simultaneously sintered despite different particle sizes of the powders in the individual layers, and which can be manufactured in a more cost-effective manner as a result.

DETAILED DESCRIPTION OF THE PRESENT INVENTION

The ceramic multi-layer filters in accordance with the invention are manufactured in accordance with the invention by the sintering temperature and material system being selected in such a manner that the powders used remain passive, i.e., that their size, morphology, and composition/crystal structure do not or only negligibly alters. The bonding of the particles takes place during sintering via an additional liquid phase, which encases the powder particles and connects on the contact surfaces. This liquid phase must be coordinated with the sintering temperature and the material system in such a way that The liquid phase has a low viscosity with the selected sintering temperature and good wetting of the powder takes place.
The liquid phase enters into no reactions or only slight reactions with the powder.
The liquid phase itself has an increased surface tension in order to avoid being absorbed into the capillary system of the pores.

Of particular advantage in the case of the solution proposed in accordance with the invention is that, when manufacturing the multi-layer filters, no or only a very low shrinkage occurs, essentially ≦1%, for the entire layer compound and also no or only very slight differences occur in the shrinkage of the individual layers.

In addition, in the case of the solution proposed in accordance with the invention, no reduction of the pore volume occurs due to adapting the shrinkages of the different layers, like that which inevitably takes place according to the state of the art with all known processes via the process guidance selected in the particular case. As a result, manufacturing filters using the process in accordance with the invention is particularly advantageous.

Advantageous in particular in the case of a high degree of fineness of the particles is a homogenous distribution of the liquid phase during preparation and a homogenous deposit during drying, as much as possible on the surface of the particles. Thermal or chemical methods of surface coating of powders (possibly co-precipitation) are possible for very fine powders.

It is advantageous for silicon carbide powder to be selected as the ceramic powder and for a borosilicate glass to be selected as the liquid phase that occurs during sintering.

It is also advantageous for aluminum oxide powder to be selected as the ceramic material and for an aluminum borosilicate glass or a lithium aluminum silicate glass to be selected as the liquid phase that occurs during sintering.

It is also advantageous if the liquid phase that occurs during sintering partially or completely crystallizes during cooling.

Commercial, closely fractionated abrasive powders are advantageously used as ceramic powders.

Advantageously, the sintering is conducted under air and advantageously at temperatures between 700 and 1200° C.

The invention is explained in more detail in the following on the basis of several exemplary embodiments.

EXAMPLE 1

900 g of a silicon carbide abrasive powder F500 (average particle size 30 µm) is mixed with 100 g of a finely ground borosilicate glass (average particle size 2 µm), the mixture is processed with the standard auxiliary agents (PVA, PEG) into a film-casting slurry and processed from this on a film-casting bench into a ceramic foil with a thickness of 0.5 mm. A second film-casting slurry, which is produced from 90 g of a silicon carbide abrasive powder F1000 (average particle size 4.5 µm) with 10 g of the borosilicate glass powder and the standard auxiliary agents, is applied to the film that is beginning to dry so that a second 50 µm thick film originates on the first film. The originated two-layer film is dried using the usual methods, divided up into individual pieces of 100×100 mm and released and then sintered 90 minutes at 800° C. under air. A sintered two-layer ceramic flat membrane originates, whereby both layers have an open pore volume of 35 to 40%, the thick, coarsely porous layer has an average pore diameter of 8 µm and the thin, microporous layer has an average pore diameter of 1 µm. The shrinkage of the two-layer film is less than 0.1% and the sintered two-layer film is completely even.

EXAMPLE 2

850 g of an aluminum oxide powder with an average grain size of 50 µm is mixed with 150 g of a finely ground lithium aluminum silicate glass powder (average grain size 3 µm), the mixture is processed with the standard auxiliary agents (PVA, PEG) into a film-casting slurry and processed from this on a film-casting bench into a ceramic foil with a thickness of 600 μm. A second film-casting slurry, which is manufactured from aluminum oxide powder with an average grain size of 5 μm and 15 g of the above-mentioned lithium aluminum silicate glass powder, which was ground to an average grain size of approximately 1 μm, and the standard auxiliary agents, is applied to the film that is beginning to dry so that a second 50 μm thick film originates on the first film. The originating two-layer film is dried using the usual methods, divided up into individual pieces of 100×100 mm and released, and then sintered 60 minutes at 950° C. under air. A sintered two-layer ceramic flat membrane originates, with both layers having an open pore volume of 35 to 40%, the thick, coarsely porous layer having an average pore diameter of 10 μm and the thin, micro-porous layer having an average pore diameter of approximately 1 μm. The shrinkage of the two-layer film is <0.1% and the sintered film is completely even.

What is claimed is:

1. A ceramic multi-layer filter comprising:
   at least two layers, said at least two layers comprising the same or different ceramic materials, and a different particle size of ceramic particles in said at least two layers;
   one of said at least two layers is a support layer and at least one other layer of said at least two layers is present as a layer with ceramic material with a smaller particle size;
   particle surfaces of all ceramic particles in each of said at least two layers, during formation of said at least two layers, are wet entirely or partially with at least one material which wets the surfaces of the ceramic particles and has the same or approximately the same thermal coefficient of expansion as the ceramic particles, and the particle size, particle morphology and particle composition/crystal structure of the ceramic particles is not altered or only slightly altered with about ≦1% shrinkage of the ceramic multi-layer filter, and in which at least one of spot and surface connections are formed between the particles by said at least one material;
   the at least one material that wets the surfaces of the ceramic particles and forms the at least one of spot and surface connections between the ceramic particles is a borosilicate glass, an aluminum borosilicate glass or a lithium aluminum silicate glass; and
   pore volume and pore size between the ceramic particles is reduced by the material only slightly or only partially but not by more than 50%.

2. The ceramic multi-layer filter according to claim 1, wherein, when more than two layers are present on the support layer, the particle size of the ceramic particles decreases in a direction going away from the support.

3. The ceramic multi-layer filter according to claim 1, wherein said at least two layers comprise layers of the same ceramic material.

4. The ceramic multi-layer filter according to claim 3, wherein the ceramic material is silicon carbide or aluminum oxide.

5. The ceramic multi-layer filter according to claim 1, wherein the ceramic material in all layers of the filter and the material which wets the surfaces of the ceramic particles, have a same composition in all layers of the filter.

6. The ceramic multi-layer filter according to claim 1, wherein the quantity of material, which wets the surface of the ceramic particles and forms the at least one of spot and surface connections between the ceramic particles, is selected in terms of size in such a way that the pore volume and the pore size between the particles is reduced only slightly by the material.

7. The ceramic multi-layer filter according to claim 6, wherein the quantity of material, which wets the surface of the ceramic particles and forms the at least one of spot and surface connections between the ceramic particles, is selected in terms of size in such a way that the pore volume and the pore size between the particles is reduced by not more than 10%.

8. The ceramic multi-layer filter according to claim 1, wherein the ceramic particles of at least two layers differentiate from one another in a ratio of 1:5 to 1:10 in terms of their average particle size.

9. The ceramic multi-layer filter according to claim 1, wherein the particles of the support layer have an average particle size of 20 to 50 μm.

10. A process for producing a ceramic multi-layer filter, said ceramic multi-layer filter comprising:
   at least two layers, said at least two layers comprising the same or different ceramic materials, and a different particle size of ceramic particles in said at least two layers;
   one of said at least two layers is a support layer and at least one other layer of said at least two layers is present as a layer with ceramic material with a smaller particle size;
   particle surfaces of all ceramic particles in each of said at least two layers, during formation of said at least two layers, are wet entirely or partially with at least one material which wets the surfaces of the ceramic particles and has the same or approximately the same thermal coefficient of expansion as the ceramic particles, and the particle size, particle morphology and particle composition/crystal structure of the ceramic particles is not altered or only slightly altered with about ≦1% shrinkage of the ceramic multi-layer filter, and in which at least one of spot and surface connections are formed between the particles by said at least one material;
   the at least one material that wets the surfaces of the ceramic particles and forms the at least one of spot and surface connections between the ceramic particles is a borosilicate glass an aluminum borosilicate glass or a lithium aluminum silicate glass; and
   pore volume and pore size between the ceramic particles is reduced by the material only slightly or only partially but not by more than 50%;
   said process comprising:
   providing at least two ceramic slurries containing at least two ceramic powders of the same or different composition but different particle sizes,
   wetting particles of the ceramic powders with a material having the same or approximately the same thermal coefficient of expansion as the ceramic particles, and which does not or only slightly alters the particle size, particle morphology and particle composition/crystal structure of the ceramic powder and which forms at least one of spot and surface connections in the case of a temperature change between the particles, where the material is only added in a quantity that coats the ceramic particles so that the pore quantity and pore size between the particles is reduced by the material only slightly or only partially but not more than 50%;
   forming at least one layer from said at least two slurries;
   partially or completely drying the formed layer;

forming at least one other layer on the formed and dried layer comprising ceramic particles with a smaller particle size than the already formed and dried layer; and jointly subjecting the formed and dried layer and the at least one other layer to a temperature increase to form the at least one of spot or surface connection between the ceramic particles by the material.

11. The process according to claim 10, wherein the at least two ceramic slurries contain forming and sintering auxiliary agents.

12. The process according to claim 10, wherein the material comprises a material that is added to the ceramic slurries in powdered form, and the material wets the surface of the ceramic particles when subjected to a temperature increase.

13. The process according to claim 10, wherein the material forms a liquid phase during increasing temperature.

14. The process according to claim 13, wherein the liquid phase has a high surface tension.

15. The process according to claim 10, wherein the material has liquid phase which partially or completely crystallizes during cooling.

16. The process according to claim 10, wherein the material comprises a pulverized material that is homogeneously distributed in the at least two ceramic slurries, and, after drying, is distributed homogeneously on the surface of the ceramic particles.

17. The process according to claim 10, in which the ceramic particles are wet with the material before manufacturing the ceramic slurry.

18. The process according to claim 17, in which the ceramic particles are wet with the material using a chemical method.

19. The process according to claim 18, wherein the chemical method comprises co-precipitation.

20. The process according to claim 10, wherein the temperature increase is performed under air.

21. The process according to claim 10, wherein the temperature is increased to a range between 700° C. and 1200° C.

22. The process according to claim 10, wherein the ceramic powders comprise closely fractionated abrasive powders.

23. The ceramic multi-layer filter according to claim 1, wherein the particle size, particle morphology and particle composition/crystal structure of the ceramic particles is not altered or only slightly altered includes no shrinkage of the ceramic multi-layer filter.

24. The ceramic multi-layer filter according to claim 1, wherein the at least two layers have the same shrinkage.

25. The process according to claim 10, wherein the particle size, particle morphology and particle composition/crystal structure of the ceramic particles is not altered or only slightly altered includes no shrinkage of the ceramic multi-layer filter.

26. The process according to claim 10, wherein the at least two layers have the same shrinkage.

* * * * *